US008695047B2

(12) United States Patent
Chennupati (10) Patent No.: US 8,695,047 B2
(45) Date of Patent: Apr. 8, 2014

(54) VIDEO STREAM PROTECTION (75) Inventor: Ashok Kumar Chennupati, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 13/291,322

(22) Filed: Nov. 8, 2011

(65) Prior Publication Data
US 2013/0117791 A1    May 9, 2013

(51) Int. Cl.
*H04N 7/18*         (2006.01)
(52) U.S. Cl.
USPC ........ 725/81; 725/118; 725/127; 370/395.21; 370/395.4
(58) Field of Classification Search
USPC ............................................ 725/81, 118, 127
See application file for complete search history.

(56) References Cited

U.S. PATENT DOCUMENTS

| | | | | |
|---|---|---|---|---|
| 5,828,653 | A * | 10/1998 | Goss | 370/230 |
| 7,050,447 | B2 * | 5/2006 | Silverman et al. | 370/412 |
| 7,620,054 | B2 * | 11/2009 | Katayama | 370/395.42 |
| 2002/0140851 | A1 | 10/2002 | Laksono | |
| 2006/0095943 | A1 | 5/2006 | Demircin et al. | |
| 2009/0252219 | A1 * | 10/2009 | Chen et al. | 375/240.02 |
| 2009/0323524 | A1 | 12/2009 | Kuhn | |

FOREIGN PATENT DOCUMENTS

| | | |
|---|---|---|
| EP | 2015527 A1 | 1/2009 |
| JP | 04306031 A * | 10/1992 |
| WO | 2006103151 A1 | 10/2006 |

OTHER PUBLICATIONS

Chen R.Y. et al., "Industry Track: Adaptive Wireless Video Streaming Proxy for Home Entertainment Networks", WICON' 06, 2ND Annual International Wireless Internet Conference, Boston MA, USA, Aug. 5, 2006, XP040058837, ACM, 2 Penn Plaza, Suite 701—New York USA, p. 1,line 1 -p. 6, left-hand column, line 28; figure 1.
International Search Report and Written Opinion—PCT/US2011/060968—ISA/EPO—Sep. 19, 2012.
Partial International Search Report, PCT/US2011/060968—International Search Authority—European Patent Office, Jul. 17, 2012.

* cited by examiner

*Primary Examiner* — Robert Hance
(74) *Attorney, Agent, or Firm* — DeLizio Gilliam, PLLC (57) ABSTRACT

System and method for protecting video stream quality during transmission over a wireless medium. A plurality of video streams may be transmitted to one or more clients in a wireless manner. It may be determined that a size of a transmit queue is above a first threshold. The plurality of video streams may be differentiated, as part of which a video stream may be selected for penalization in order to protect the other video streams of the plurality of video streams. A scheduling penalty may be imposed on the selected video stream based on determining that the size of the transmit queue is above the first threshold and based on differentiating the plurality of video streams.

19 Claims, 3 Drawing Sheets

VIDEO STREAM PROTECTION

BACKGROUND

1. Field of the Disclosure

The present invention relates generally to wireless communication, and more particularly to a system and method for protecting video streams transmitted over a wireless medium.

2. Description of the Related Art

Wireless video streaming applications are becoming increasingly common. In particular, video streaming over 802.11 (WLAN) wireless networks, including simultaneous streaming of multiple video feeds to different client devices, has become more commonplace. Video streaming tends to have stringent Quality of Service (QoS) requirements, especially in terms of packet loss rate, jitter, and latency. These QoS requirements mean that video streaming over a wireless medium demands a certain amount of dedicated bandwidth in order to be successful. The dynamic nature of a shared wireless medium presents challenges to consistently providing this dedicated bandwidth to video streams.

For example, although a wireless network may initially be able to support multiple video streams, changing medium conditions may create a situation in which net available bandwidth is not sufficient for all of the video streams which were initially supported. In this case, all of the video streams may be negatively impacted, potentially including glitches on all of the video streams, which of course may present a severe negative impact on the video quality and user experience. Accordingly, improvements in the field would be desirable.

SUMMARY OF THE DISCLOSURE

Embodiments of the disclosure are presented in order to minimize the impact of changing medium conditions on video streaming over a wireless medium. In particular, embodiments of the disclosure are directed to situations in which a wireless transceiver (e.g., a router) is concurrently streaming video applications to one or more client devices. For example, if medium conditions change such that the wireless medium is no longer providing sufficient bandwidth to all of the video streams, embodiments of the disclosure may be implemented in order to penalize just one video stream or some subset of the video streams in order to protect the quality of the remaining video streams, rather than lose quality on all of the video streams.

Embodiments of the disclosure accordingly include a method for protecting quality of video streams, and a system configured to implement the method. In some embodiments, the system configured to implement the method may be a wireless transceiver. For example, in some embodiments the method is implemented by an access-point device (e.g., a router) implementing a version of the 802.11 (WLAN) protocol to provide a (wireless) local area network for one or more client devices.

The wireless transceiver may include a first port, a second port, and control logic. The wireless transceiver may also include a variety of other components, as desired.

The first port may be configured to communicate with another network. For example, in some embodiments the first port is configured for bi-directional communication with a wide area network (WAN), such as the internet. The first port may be a wired port or a wireless port. Accordingly, the first port may be used for transmitting data to and receiving data from one or more external sources, e.g., on the internet. The transmitted data may include requests for video stream data, among other possible data. The received data may include the requested video stream data, among other possible data.

The second port may be configured to communicate with client devices in the wireless network provided by the wireless transceiver. Accordingly, the second port may be a wireless port, e.g., including an antenna for wirelessly transmitting and receiving signals. The wireless transceiver may form wireless links with one or more client devices (e.g., in a local area) via the second port.

The client devices may thus be configured to wirelessly communicate with each other, and in some embodiments, with devices (e.g., server computers) in an external network, via the wireless transceiver. For example, in some embodiments the wireless transceiver is configured to receive, via the second port, a request for a video stream from a client device, and send, via the first port, the request for the video stream to an external source (e.g., a server computer located in a WAN coupled directly or indirectly to the first port). The wireless transceiver may then receive (via the first port) the video stream data, and transmit the video stream data to the client device which requested the video stream.

In some embodiments, the wireless transceiver may also include a receive buffer. The receive buffer may store received video stream data. For example, the receive buffer may temporarily store received video stream data after receiving the video stream data via the first port and before transmitting the video stream data via the second port. In some embodiments, the wireless transceiver may also include a transmit queue indicating video stream data that is to be transmitted. In some embodiments the receive buffer may act as the transmit queue; for example, video stream data packets may be transmitted in a rolling first-in-first-out manner from the receive buffer. Furthermore, the receive buffer/transmit queue may serve to buffer packets received via both the first port and the second port.

It should be noted, however, that in other embodiments the transmit queue may be distinct from the receive buffer; for example, the transmit queue may be associated with/included as part of the second port (which transmits the data to client devices), while the receive buffer may be included with the first port (which receives the data from an external source). It should also be noted that, in some embodiments, the second port may also have a separate receive buffer (for data received wirelessly via the first port from client devices), and/or the first port may also have a separate transmit queue (for data to transmit via the first port, e.g., to an external network). However, for the purposes of this disclosure, references to 'the receive buffer' are intended to refer to a receive buffer configured to buffer at least data received via the first port. Similarly, references to 'the transmit queue' are intended to refer to a transmit queue indicating at least data to be transmitted via the second port.

The control logic may be coupled to the first port and the second port. The control logic may be configured to implement the method. For example, in some embodiments the control logic includes one or more processors and a memory medium including program instructions executable by the one or more processors to implement the method. The method may be performed as follows.

Video stream data for a plurality of video streams may be received. The video stream data may be received via the first port. The video stream data may be stored in the receive buffer. The video stream data may include first video stream data (corresponding to a first video stream, second video stream data (corresponding to a second video stream), and in some embodiments, video stream data for one or more additional video streams.

The video streams (e.g., including the video stream data) may be transmitted in a wireless manner. The first video stream may be transmitted to a first client device. The second video stream (e.g., including the second video stream data) may also be transmitted in a wireless manner, to the first client device or to a second client device. Additional video streams, if present, may be transmitted to the first, second, and/or one or more other client devices.

It may be determined that the size of the transmit queue is above a first threshold. For example, video stream data may be received at a rate greater than video stream data may be transmitted. In some embodiments, this may be caused at least in part by a change in wireless medium conditions (e.g., the medium conditions of the wireless medium over which the video stream data is transmitted). The plurality of video streams may then be differentiated, e.g., in order to select a stream to penalize, e.g., in order to protect the quality of the remaining video streams (i.e., the other video streams of the plurality of video streams). The video streams may be differentiated based on an analysis of the goodputs of the video streams, in some embodiments. As described further below, the term "goodput" refers to a measurement involving a rate at which useful data is delivered. For example, it may be determined that a goodput of the selected video stream is lower than the goodputs of the rest of the plurality of video streams. Accordingly, it may be determined to penalize the selected video stream in order to protect the quality of the other video streams. In some embodiments, the penalty may include a scheduling penalty. For example, in some embodiments, a scheduling penalty may be imposed on the selected video stream based on determining that the size of the transmit queue is above the first threshold and based on differentiating the plurality of video streams. The scheduling penalty may include skipping scheduled transmission of selected video stream data at least one time, and in some embodiments may include skipping scheduled transmission of selected video stream data a plurality of (consecutive or non-consecutive) times. Alternatively, or in addition, the scheduling penalty may include reducing the length (e.g., amount of time or allotted data) of a scheduled transmission of video stream data of the selected video stream at least one time.

In some embodiments, the analysis of goodputs of the video streams may include determining whether the difference between the highest and lowest goodputs of the plurality of video streams is greater than a differentiation threshold. If the difference is greater than the differentiation threshold, the streams may be differentiated based on the relative goodputs of the plurality of video streams. On the other hand, if the difference is less than the differentiation threshold, the differentiation (and decision to penalize a particular video stream) may not be based on goodput differentiation, but may be based on one or more other criteria. This may be important in order to avoid alternately or haphazardly penalizing all of the video streams, e.g., if all of the video streams have (approximately or exactly) equally good wireless links (e.g., if the video streams are transmitted to the same client device), since this would defeat the intention of limiting quality loss to a minimum number of video streams in order to protect the remaining video streams. Examples of alternate criteria may include first-come-first-serve (e.g., differentiating based on and determining to penalize a most recently established video stream connection), relative bandwidth requirements of the video streams (e.g., differentiating based on and determining to penalize a video stream connection requiring the most (or the least) bandwidth), and/or other criteria.

In some embodiments, it may be determined that the size of the transmit queue is below a second threshold. For example, if the scheduling penalty on the selected video stream has been effective in allowing the wireless transceiver to catch up on transmission of data in the transmit queue (and/or if the medium conditions change such that the goodput of the selected video stream has increased significantly, or one or more of the video streams has stopped), the amount of data in the transmit queue may decrease. Accordingly, in some embodiments the scheduling penalty on the selected stream may be removed based on determining that the size of the transmit queue is below the second threshold.

In some embodiments, user input may be received to configure one or more aspects of the method. For example, user input may be received indicating a preferred value for the first threshold, the second threshold, the differentiation threshold, the scheduling penalty, and/or a variety of other parameters.

In some embodiments, it may be determined that the receive buffer is full. This may occur for a variety of reasons. For example, if the scheduling penalty on the selected video stream is insufficient to clear up the transmit queue and the receive buffer, and data has continued to be received at a rate higher than it is transmitted, this may cause a receive buffer full condition. Other examples of situations that could cause receive buffer full conditions even after imposing a scheduling penalty on a video stream could include sudden changes in channel conditions or incoming (e.g., new) video bursts.

Additional video stream data may be received after it is determined that the receive buffer is full. Since the buffer may already be full, some data may be dropped as a result of receiving the additional video stream data. If the additional video stream data is not for the selected video stream, video stream data for the selected video stream may be dropped (e.g., removed/deleted) from the buffer in order to free sufficient room for the received additional video stream data. In other words, the selected video stream data may be dropped from the buffer based on determining that the buffer is full, differentiating the plurality of video streams, and receiving the additional video stream data.

If the additional video stream data is for the selected video stream, the additional video stream data itself may be dropped. In other words, since there may be insufficient room in the buffer for additional data without dropping data that is already stored in the buffer, the just-received additional video stream data for the selected video stream may be dropped (i.e., not stored in the receive buffer) in order to protect the quality of the other video streams of the plurality of video streams.

It should be noted that in some embodiments, two or more video streams may be selected (e.g., in a video stream differentiation step) for penalization. In this case, (similar or different) scheduling penalties may be implemented for each of the video streams selected for penalization. Alternatively, or in addition, data (e.g., packets) of the video streams selected for penalization may be removed from the receive buffer if other video stream data (e.g., packets) are received under buffer full conditions, and/or received data of the video streams selected for penalization may be dropped if received during a buffer full condition. Penalizing multiple video streams may be typical in embodiments including a larger number of video streams and/or in embodiments in which medium conditions undergo more significant instability, but may not be desirable unless it is not possible to protect all other video streams by penalizing just one video stream.

Thus, a significant advantage of the method is that, during conditions under which available bandwidth is insufficient for all active video streams, the method may be advantageously implemented to protect the quality of as many video streams as possible. For example, without the method, (i.e., if no video streams were penalized), the quality of all video streams might suffer significant loss of quality during such conditions. Instead, by penalizing a selected video stream of a plurality of video streams according to embodiments of this disclosure, loss of video stream quality may be advantageously limited to just the selected video stream, thereby protecting the quality of all other active video streams.

Another advantage of this scheme is that it may result in more effective wireless bandwidth utilization. For example, if embodiments of the method are used to remove or penalize less efficient data (e.g., video) streams, more (and more efficient) data streams may utilize the medium. In other words, the method may provide for support of maximum possible video streams at any point in time, because the available wireless bandwidth will generally be used to transmit data over good wireless links while any bad wireless links will generally be penalized.

A further advantage is that the method may provide an alternative means of "admission control" (e.g., by penalizing/removing packets of one or more video streams during oversubscribed medium conditions) that doesn't require knowledge of the traffic specifications of a given video stream (e.g., the bandwidth required to support the video stream) before admitting the video stream.

BRIEF DESCRIPTION OF THE DRAWINGS

A better understanding of the present invention can be obtained when the following Detailed Description of the Embodiments is read in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE DISCLOSURE

Terms

The following is a glossary of terms used in the present application:

Memory Medium—Any of various types of memory devices or storage devices. The terms "memory" and "memory medium" are intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as flash memory, hardware registers, a magnetic media (e.g., a hard drive), or optical storage. The memory medium may comprise other types of memory as well, or combinations thereof. The term "memory medium" may include two or more memory mediums.

Computer System—Any of various types of mobile or stationary computing or processing systems, including a personal computer system (PC), mainframe computer system, workstation, network appliance, Internet appliance, mobile phone, smart phone, laptop, notebook, netbook, or tablet computer system, personal digital assistant (PDA), multimedia device, or other device or combinations of devices. In general, the term "computer system" can be broadly defined to encompass any device (or combination of devices) having at least one processor that executes instructions from a memory medium.

Wireless Link—A wireless communicative coupling between two devices (which may be referred to as "wireless devices"). A wireless link may be established via any of a variety of wireless communication protocols, including any of various versions of IEEE 802.11 (WLAN), Bluetooth, Wibree, wireless USB, ZigBee, or any of various cellular network protocols, among others.

Access-Point Device—As used herein, an access-point device (or station) is considered a device that allows another device to establish a communicative coupling (e.g., wireless and/or wired) with the access-point device. According to some communicative protocols, an access point device may be required to be specifically configured to be an access point device, while other communicative protocols may allow any device configured according to that protocol to act as an access-point device.

Video Stream—As used herein, the term "video stream" is used to refer to visual (including audiovisual or other multimedia) content that is provided over a medium for presentation at a user device concurrent with ongoing provision of the content. For example, a video stream may include data that has been received by and is being presented by a user device as well as data that is in the process of transmission to the user device from a video stream source (e.g., to be presented at the user device at a later time in continuation of the content currently being provided). A video stream may be provided over a wired and/or wireless link.

Figure 1:
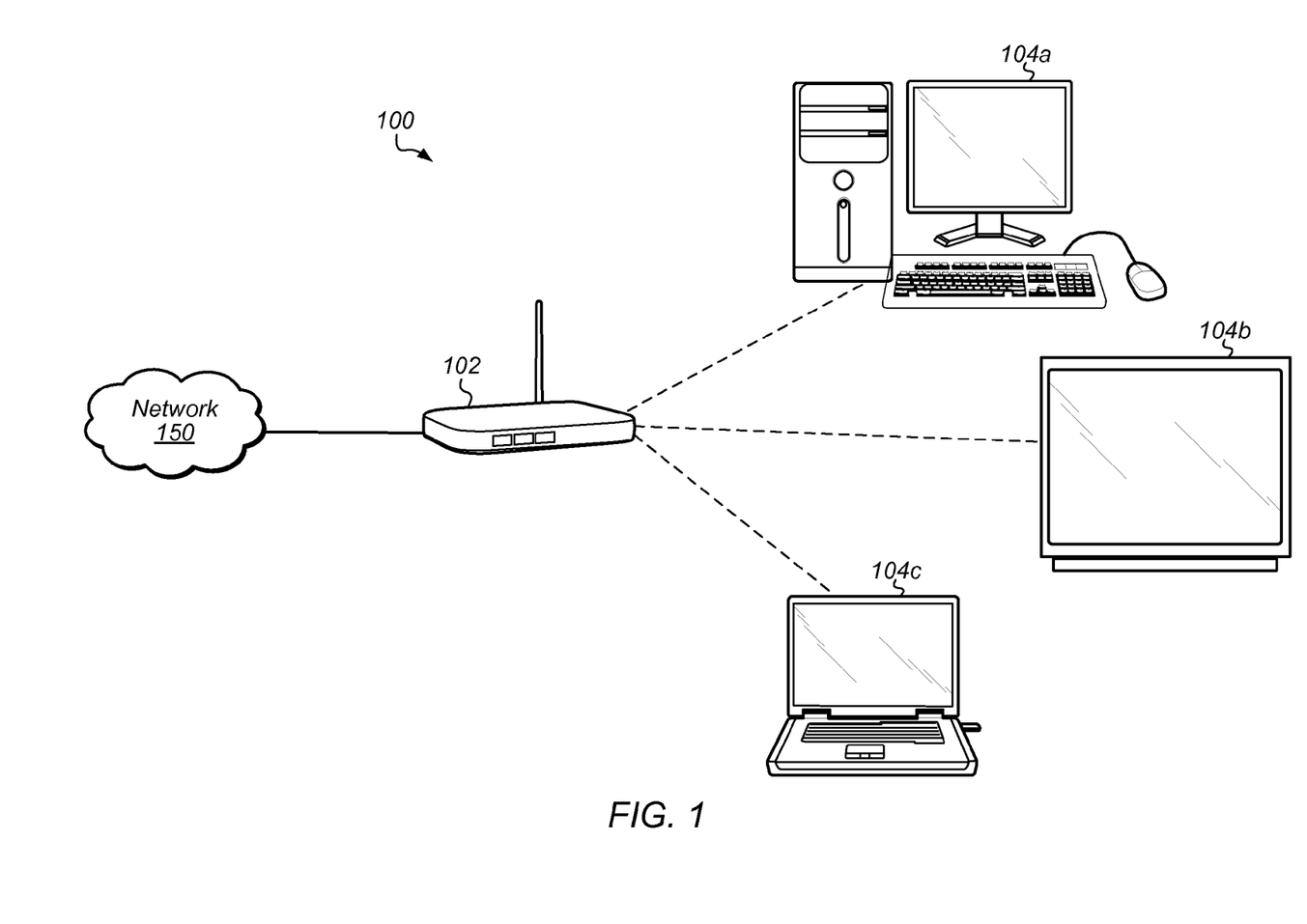
FIG. 1 illustrates exemplary communication links between devices, according to one embodiment.

FIG. 1

Embodiments of the disclosure relate to protecting video streams over a wireless medium under changing medium conditions. FIG. 1 illustrates an exemplary system 100 in which embodiments of the disclosure may be implemented. As shown, the system may include wireless links between a wireless transceiver 102 and wireless devices 104a-c. The wireless links may enable wireless communication between wireless devices 102 and 104a-c according to any of a variety of wireless communication technologies. In one exemplary implementation, the wireless links may be established as part of an IEEE 802.11 (WLAN) network. For example, wireless device 102 is shown as a router, and may act as a gateway-type device (i.e., an access point transceiver). Thus in such an embodiment, any WLAN enabled wireless devices within communicative range, such as desktop computer 104a, Wi-Fi enabled television 104b, and/or laptop computer 104c, may establish a WLAN wireless link with router 102 to join the WLAN network. In other envisioned embodiments, the wireless links may be established according to any of a variety of other wireless communication protocols.

Because the communicative links between wireless transceiver 102 and client wireless devices 104a-c may be wireless in nature, they may be somewhat susceptible to changing medium conditions, as is common for wireless communication media. For example, channel fades, interference, and the inherently mobile nature of many devices that utilize wireless media for communication can all contribute to temporary or long term changes in signal quality and maximum bandwidth of a wireless link.

While the illustrated embodiment shows wireless devices 104a-c as specific types of devices, it should be noted that, in various embodiments, wireless devices 104a-c may be any of a wide variety of suitable wireless devices, which may include, without limitation, mobile phones (including smart phones); tablet, netbook, notebook, laptop, and/or desktop computers; personal digital assistants; multimedia players (portable or stationary); routers, hubs, and/or other gateway type devices; and/or other mobile devices/computing systems which are operable to use wireless communication.

In addition, while FIG. 1 illustrates a system in which three client wireless devices are supported, in other embodiments a different number of client wireless devices are supported. For example, embodiments may comprise one, two, or more than three wireless devices form wireless links with wireless transceiver 102.

As shown, wireless transceiver 102 may also be communicatively coupled to a network 150. The network 150 may be any of a variety of types of networks, including, but not limited to, a wired or wireless local area network (LAN) or wide area network (WAN) (such as the internet). For example, in some embodiments, the wireless transceiver 102 may be configured to provide internet access to client devices 104a-c via an internet service provider. Thus, in some embodiments, wireless transceiver 102 may be configured to receive content requests from client devices 104, transmit those content requests to appropriate destinations in network 150, receive the requested content from network 150, and transmit the requested content to the client devices 104.

In some embodiments, wireless transceiver 102 may be configured to implement embodiments of the disclosure. For example, in some embodiments, the content requested by the client devices may include a plurality of video streams, and so wireless transceiver 102 may be configured to receive the video streams from network 150 and transmit the video streams to client devices 104a-c. In such embodiments, in case of changing medium conditions negatively impacting video stream quality, the wireless transceiver may be configured to limit the loss of video quality to one or a minority of the video streams, thereby protecting the quality of the remaining streams, such as according to an embodiment of the method described with respect to FIG. 3.

Figure 2:
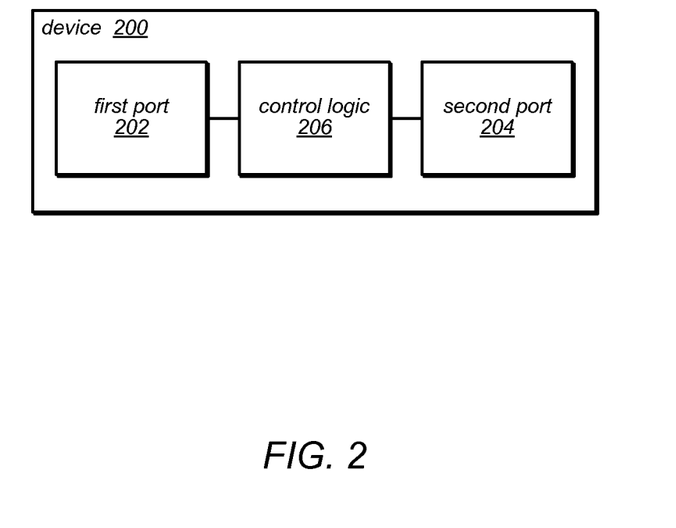
FIG. 2 is a block diagram of an exemplary device according to one embodiment.

FIG. 2

FIG. 2 is a simplified block diagram illustrating various components of a device 200 which is capable of protecting quality of video streams according to various embodiments of the disclosure. For example, in some embodiments, wireless transceiver 102 shown in FIG. 1 may be implemented as device 200 shown in FIG. 2.

As shown, device 200 may include a first port 202, a second port 204, and control logic 206. The control logic 206 may be coupled to the first port 202 and the second port 204 and may be configured to implement embodiments of the method described with respect to FIG. 3.

In some embodiments, device 200 may be configured to communicate with a first network via the first port 202. In some embodiments, the first network may be a wide area network (WAN) (such as the internet), or a local area network (LAN) (which may be an intermediate network with access to a WAN), among possible types of networks. For example, the first network may be network 150 if wireless transceiver 102 shown in FIG. 1 is implemented as device 200 shown in FIG. 2.

According to various embodiments, the first port may be a wired port (e.g., coupling to the first network via a cable, digital subscriber line (DSL), broadband over power line (BPL), or other wired broadband connection) or a wireless port (e.g., coupling to the first network via a WiMAX or other wireless broadband connection).

In some embodiments, the first port 202 may include a receive buffer (e.g., a memory medium) for storing data received via the first port, e.g., until such data can be processed/retransmitted. The first port 202 may also include a variety of other components typical of communication ports (such as an antenna, e.g., if first port 202 is a wireless port), according to various embodiments, as would be recognized by one of skill in the art in light of this disclosure.

In some embodiments, device 200 may be a router or other access-point device which provides access to the first network to client devices through a local area network via the second port 204. In some embodiments, second port 204 may a wireless port, providing a wireless local area network (WLAN) according to the IEEE 802.11 protocol. For example, if wireless transceiver 102 shown in FIG. 1 is implemented as device 200 shown in FIG. 2, device 200 may provide wireless links to client devices 104a-c via the second port 204, effectively enabling the client devices 104a-c to access the first network via the device 200.

In some embodiments, the second port 204 may include an antenna (or multiple antennas, e.g., for MIMO and/or for implementing multiple wireless protocols) for wirelessly transmitting and/or receiving signals. Similar to the first port, the second port 204 may also include a variety of other components typical of communication ports (such as a receive buffer, similar to first port 202), according to various embodiments, as would be recognized by one of skill in the art in light of this disclosure.

According to various embodiments, the control logic 206 may be implemented using any of various types of logic, such as analog logic, digital logic, a processor (such as a CPU, DSP, microcontroller, etc.), an ASIC (application specific integrated circuit), an FPGA (field programmable gate array), or any combination of the above.

The control logic 206 may include a memory medium in some embodiments. The memory medium may store program instructions executable by the control logic 206 to perform one or more aspects of the method described with respect to FIG. 3, and/or perform other device functionality.

As will be understood by those of skill in the art in light of this disclosure, device 200 may also include any of a variety of other components as desired, e.g., for implementing other device functionality. Such components are not shown in order to avoid obscuring details of the disclosure.

Figure 3:
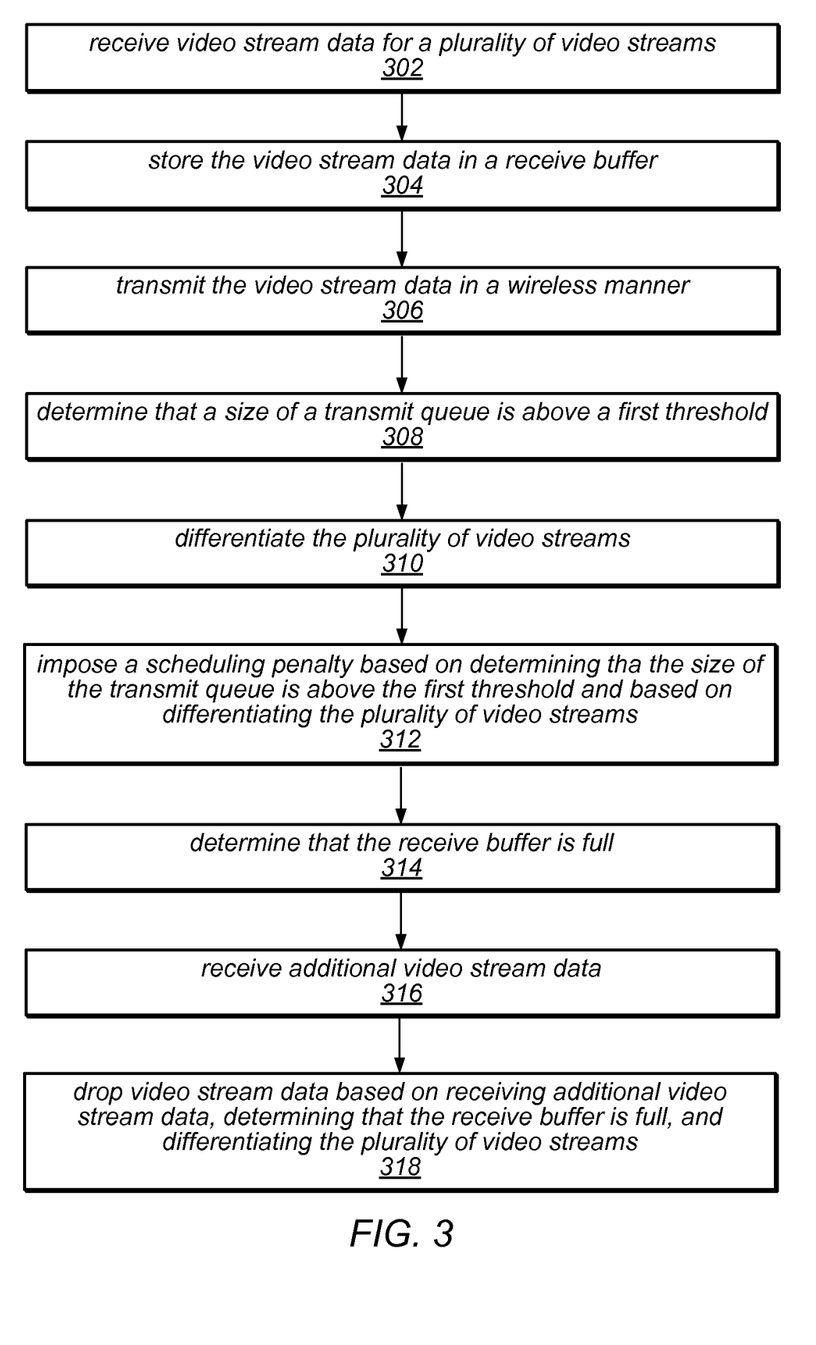
FIG. 3 is a flowchart diagram illustrating embodiments of a method for protecting quality of video streams.

FIG. 3

FIG. 3 is a flowchart diagram illustrating embodiments of a method for protecting quality of video streams. More specifically, embodiments of the disclosure are directed at systems in which a plurality of video streams are simultaneously provided over a wireless medium. For example, referring to FIG. 1, embodiments are considered in which wireless transceiver 102 (implemented as device 200 or in another way) is configured to implement the method while simultaneously providing video streams received via network 150 to one or more of client devices 104a-c. It should be noted, though, that while this example represents one possible implementation of the method of FIG. 3, other implementations are also considered, and the disclosure as a whole should not be considered limited to this particular embodiment. For example, embodiments are also considered in which wireless transceiver 102 stores video content locally, and accordingly is configured to provide one or more of the plurality of video streams from a local memory (e.g., instead of receiving the video stream(s) via network 150) while implementing the method.

Embodiments of the methods may be implemented by a wireless transceiver. The wireless transceiver configured to implement the method may include a first port for receiving video stream data (and, in some embodiments, providing more general bi-directional data communication) from an external source, such as a network (e.g., the internet or another network). Additionally, the wireless transceiver configured to implement the method may include a second port for transmitting the video stream data, e.g., to one or more clients. The second port may be a wireless port, in some embodiments; for example, the second port may include an antenna for wirelessly receiving and transmitting signals (e.g., video stream data or other data) to one or more client devices. Much like the first port, the second port may also be configured to provide general bi-directional data communication with one or more client devices (e.g., forming a wireless local area network (WLAN), possibly according to the 802.11 protocol).

Furthermore, the wireless transceiver may include control logic coupled to the first port and the second port and configured to implement the method. In some embodiments the control logic includes one or more processors and a memory medium including program instructions executable by the one or more processors to implement the method; according to other embodiments, the control logic may include any of various other forms of logic in addition to or instead of either of a processor or a memory medium.

While the steps described below with respect to FIG. 3 are shown in a certain order, it should be noted that, according to various embodiments, one or more of the steps may be omitted, repeated, or performed in a different order than shown. One or more additional steps may also or alternatively be added, as desired. The method may be performed as follows.

At step 302, video stream data for a plurality of video streams may be received. The video stream data may be received via the first port, e.g., externally from a network such as a local area network or the internet. The video stream data may include first video stream data intended for a first client device. For example, the first client device may have sent a request for a first video stream to the wireless transceiver, the wireless transceiver may have sent the request for the first video stream to a source of the first video stream (e.g., a server in the external network accessed via the first port), and the first video stream data may be received at the wireless transceiver from the source of the first video stream.

The video stream data may also include second video stream data. The second video stream data may be intended for a second client device or may also be intended for the first client device. In either case, in a similar manner as the first video stream, the intended client device may have sent a request for the second video stream to the wireless transceiver, as a result of which the wireless transceiver may have sent the request for the second video stream to a source of the second video stream, and the second video stream data may be received at the wireless transceiver from the source of the second video stream.

The video stream data may also include video stream data for any number of additional video streams, intended for the first client device, the second client device, and/or one or more other client devices.

At step 304, the video stream data may be stored in a receive buffer. The wireless transceiver may include a receive buffer for buffering received data, e.g., until such data can be processed and/or transmitted to its intended recipient. The buffered data may include video stream data for each of the first and second video streams, as well as any other active video streams.

At step 306, the video stream data may be transmitted in a wireless manner. The first video stream data may be transmitted to the first client (i.e., the client device requesting the first video stream) via the second port. In a similar manner, the second video stream data and the video stream data for any other video streams may be transmitted to their intended client devices via the second port. In some embodiments, as video stream data is transmitted successfully, the successfully transmitted data may be removed from the receive buffer.

It should be noted that the rates at which data (e.g., video stream data) is received at the first port and transmitted at the second port may differ. The relative rates at which data may be received and subsequently transmitted may be critical in determining when embodiments of the disclosure may be implemented. The rate at which incoming data (data received at the first port) is received may be referred to herein as "ingress bandwidth", while the rate at which outgoing data (data transmitted at the second port) is transmitted may be referred to herein as "egress bandwidth".

The wireless device may be configured to monitor ingress and egress bandwidth. For example, the wireless device may be configured to attempt to insure that ingress bandwidth does not exceed egress bandwidth. In other words, it may be desirable to avoid overloading the wireless network by allowing more data to come in via the first port than can be transmitted via the second port. It may be particularly important to avoid overloading the wireless network ("oversubscribing" the wireless medium) if a significant portion of the data transmitted over the network is video stream data. This may be at least in part because video streaming typically has stringent Quality-of-Service (QoS) requirements (e.g., in terms of packet loss rate (PLR) and jitter/latency).

Accordingly, in some embodiments, a form of "admission control" may be implemented. Admission control may control or limit the addition of new video streams to a wireless network. As part of the process of admitting a new video stream over the network (e.g., if a client device requests a new video stream), the wireless transceiver may be configured to determine an amount of bandwidth required by the new video stream and an amount of bandwidth available on the wireless network (or, more specifically, on the wireless link between the client device requesting the new video stream and the wireless transceiver). If the amount of bandwidth required by the new video stream is less than the amount of bandwidth available, the new video stream may be admitted. If the amount of bandwidth required by the new video stream exceeds the amount of bandwidth available, the new video stream may not be admitted.

Thus, in some embodiments, each of the plurality of video streams may have been admitted according to admission control criteria (e.g., available bandwidth may have exceeded the required bandwidth for the second stream at the time of admission). However, admission control may be an optional aspect of the method, and other embodiments in which admission control is not implemented are also considered.

At step 308, it may be determined that a size of a transmit queue is above a first threshold. The transmit queue may indicate data that is to be transmitted. In some embodiments, the receive buffer may act as the transmit queue; for example, in some embodiments, video stream data packets may be transmitted in a rolling first-in-first-out manner from the receive buffer. In other embodiments, the transmit queue may be distinct from the receive buffer. The transmit queue in this case may point to data in the receive buffer in an order in which the data should be transmitted.

Under circumstances in which data is transmitted as fast as (or faster than) it is received, the size of the transmit queue may typically be quite short. Under constant (or relatively constant) medium conditions, this may typically be the case. For example, as noted above, if a form of admission control is implemented, and medium conditions are relatively stable, available bandwidth for transmission of video streams may remain sufficient to keep up with received video stream data, and the size of the transmit queue may only be a small proportion of a maximum transmit queue size (e.g., the size of the receive buffer may act as a limiting factor to the transmit queue size).

However, unfortunately, effective admission control may be difficult to implement. One significant factor is that determining an amount of bandwidth required by the new video stream may not always be possible. For example, many video stream sources may not provide traffic specification parameters of video streams. In this case an estimation of the required bandwidth may be made, or admission control may be skipped altogether.

In addition, even if admission control is effectively implemented, it cannot always protect against changing medium conditions. For example, because the communication links formed via the second port may be wireless in nature, egress bandwidth may fluctuate over time. For example, the wireless medium over which the plurality of video streams may be transmitted may be subject to changing medium conditions. For example, factors that could impact channel conditions could include channel fades, interference (from other transceivers and/or physical objects), and/or changing path conditions (e.g., due to physical movement of a client device, such as a laptop computer), or a variety of other factors.

These factors may affect different wireless links (e.g., between the wireless device and different client devices) differently. For example, if the wireless transceiver has established first and second wireless links with a first client device and a second client device, and the second client device moves (which may be expected in many situations, especially if the second client device is a mobile device such as a laptop or a smart phone), this may affect the second wireless link, although it may not affect the first wireless link. On the other hand, some changes in medium conditions may affect all wireless links in a similar manner. For example, if a second wireless network is formed (e.g., a wireless router in a neighboring house is switched on) on the same or a neighboring channel to the channel on which the first and second wireless links are established, this could cause similar levels of interference to both of the first and second wireless links.

Thus, under some circumstances, situations may occur in which egress bandwidth shrinks to a lower level than ingress bandwidth. In this case, the receive buffer and transmit queue may accumulate data to be transmitted faster than that data is actually transmitted. This over-subscription of the wireless medium may result in jitter, latency, and generally reduced video quality over all wireless connections (i.e., including all video streams), regardless over whether the cause of the over-subscription is a general degradation of medium conditions affecting all wireless links, or a single specific wireless link experiencing a degradation of bandwidth/signal quality.

Accordingly, the size of the transmit queue may be monitored in some embodiments. Under circumstances in which the size of the transmit queue is larger than a first threshold, action may be taken to protect the quality (e.g., as reflected in measurements of quality such as Packet Loss Rate (PLR), Latency or Jitter) of at least some video streams. According to one embodiment, the first threshold may be ¾ of the maximum possible size of the transmit queue (e.g., the size of the receive buffer). Other values are also considered for the first threshold. As part of this process, it may be important to determine which video stream(s) should be protected and/or which video stream(s) should be penalized in order to protect the remaining video stream(s).

Accordingly, in step 310 the plurality of video streams may be differentiated. Differentiating the first and second video streams may include determining a video stream to penalize. In some embodiments, this may be based on an analysis of goodputs of the plurality of video streams, with the intention of penalizing the video stream with the lowest goodput. This may be ideal if a single bad connection is the cause of medium over-subscription.

It should be noted that the term "goodput" may be defined differently in different systems. Generally speaking, a measurement referred to as 'goodput' may typically refer to a rate at which useful data is delivered. For example, goodput measurements may sometimes be determined by removing overhead data and/or lost data which must be retransmitted from a base data rate. For example, in one embodiment, the goodput of a wireless link may be defined according to the equation:

$$\text{goodput} = \text{data rate} * k * (1-\text{PER})$$

where the 'data rate' is the current PHY data rate of the wireless link, 'k' is a scaling factor based on the PHY overhead ratio (e.g., depending on the protocol used) of the wireless link, and the 'PER' is the packet error rate of the wireless link. For the purposes of analyzing relative goodputs of different video streams over different wireless links, the 'k' factor may, in some embodiments, cancel out between different video streams. Accordingly, in those embodiments, the main differences between goodputs of different video streams may be due to data rates and packet error rates of the wireless links over which the different video streams are transmitted. In other embodiments the k factor may also be relevant to differences in goodput between video streams.

As noted above, for purposes of differentiation by goodput, it would be ideal if the difference between goodputs of various video streams is significant. However, depending on the circumstances, it is possible that no single video stream has a significantly worse goodput than any other video stream. For example, if multiple video streams are transmitted to a single client (e.g., over the same wireless link), it may be likely that the video streams may have equal or nearly equal goodputs. Similarly, if broad-scale interference on the wireless medium causes degradation in bandwidth and/or signal quality for all wireless links in similar measure, different video streams, whether to different clients or the same client, may not have significantly different goodputs. If goodput were used to select a video stream to penalize in this case, successive goodput measurements and differentiation of video streams could lead to different video streams being penalized in a haphazard manner, which could interfere with the goal of protecting at least some video streams under medium over-subscription conditions. Accordingly, in such circumstances, it would be desirable to use one or more different criteria, instead of goodput, to differentiate the video streams and determine a video stream to penalize.

In some embodiments, in order to accomplish this, differentiation may include determining a difference between a highest goodput of a video stream and a lowest goodput of a video stream. The difference may be compared to a "differentiation threshold", in order to confirm that there is sufficient difference in goodputs to differentiate video streams based on goodput. For example, in one exemplary embodiment, in which goodput values might range between 0-300 megabits per second (Mbps), differentiation threshold values might be on the order of 40-100 Mbps. Other ranges are also considered.

If the difference between the highest and lowest goodputs of video streams is greater than the differentiation threshold, a video stream with the lowest goodput may be selected for penalization. If the difference between the highest and lowest goodputs of video streams is less than the differentiation threshold, another criterion (or multiple other criteria) may be used. Examples of other criteria might include first-come-first-serve, e.g., in which a most recently added video stream may be selected for penalization; bandwidth requirement, e.g., in which a video stream with a lowest (or highest) required bandwidth may be selected for penalization; priority level (e.g., user selected or otherwise determined), e.g., in which a video stream being transmitted to a client device with a lowest priority may be selected for penalization; or any of a variety of other criteria.

It should be noted that in some embodiments, one or more criteria other than (or in addition to) goodput may be used regardless of the difference between goodputs of the various video streams. For example, in some embodiments, each video stream may be assigned a priority value. The video stream priority levels may be based on a (e.g., weighted) combination of characteristics of the different video streams and/or may be based on user-assigned priority values. Thus, in some embodiments, selection of a video stream for penalization may be based on the (user configured or otherwise generated) priority level or value of the selected stream relative to the other video stream(s). For example, in some embodiments a video stream with a lowest priority among the currently queued video streams may be selected for penalization.

In step 312, a scheduling penalty may be imposed on a video stream which has been selected for penalization. In some embodiments, video stream packets may be scheduled in a round-robin fashion; in other embodiments, other scheduling arrangements may be used. Thus in at least some embodiments, all of the video streams may, under normal circumstances, receive an equal number of scheduling opportunities. However, if the wireless link over which one of the video streams in particular is transmitted has gone bad, significantly more time may be required to transmit each packet. This may be due, for example, to a significant packet error rate and numerous corresponding retry attempts. As a result, all of the video streams may experience jitter and latency due to the video stream with the bad connection, as they are forced to wait longer for their packets to be transmitted. Thus, penalizing a 'bad' video stream by imposing a scheduling penalty may be an effective way of protecting the quality of the remaining video streams.

In some embodiments, imposing the scheduling penalty may include skipping one or more scheduled transmissions of the video stream selected for penalization. Thus, instead of a round robin (or other scheduling arrangement, depending on the embodiment) scheduling arrangement, a modified scheduling arrangement may be temporarily implemented, in which a pre-determined number of scheduling opportunities of the selected stream are skipped. In some embodiments, imposing the scheduling penalty may also or alternatively include reducing the scheduling slot size (time or allotted data) of the selected video stream. Either or both of these scheduling penalty options can be user configurable. For example, in some embodiments, user input may be received indicating a number of times to skip scheduled transmission of the selected video stream and/or a reduced length of transmission opportunities (and in some embodiments, a number of scheduled transmissions to which to apply the scheduling penalty).

In some embodiments, after the scheduling penalty has been imposed, the video stream selected for penalization may again be scheduled for transmission in the normal scheduling arrangement. However, in other embodiments, after one allowed scheduling opportunity (or some other predetermined number of allowed scheduling opportunities), the scheduling penalty may be re-implemented, until the size of the transmit queue falls below a second threshold. In still another embodiment, imposing the scheduling penalty may include skipping all scheduled transmissions of the video stream selected for penalization until the size of the transmit queue falls below the second threshold. In one embodiment, the second threshold may be ¼ of the maximum possible size of the transmit queue (e.g., the size of the receive buffer). Other values are also considered for the second threshold. Other embodiments in which different types of scheduling penalties are imposed are also envisioned.

In some embodiments, imposing a scheduling penalty on a video stream selected for penalization may not be sufficient to protect the quality of the remaining video streams. For example, even when limiting the scheduling opportunities of the video stream selected for penalization, it is possible that ingress bandwidth may still exceed egress bandwidth, and video stream data packets may continue to be added to the receive buffer until a buffer-full condition occurs, in which there is insufficient space in the receive buffer to store any additional packets.

In such a situation, in step 314, it may be determined that the receive buffer is full. Once this occurs, any additional data received at the first port would normally be dropped, which would typically lead to loss of quality in all video streams for which received data is dropped. However, in keeping with the goal of limiting loss of quality to a minimum number of video streams, it may be possible to limit dropped packets to the video stream selected for penalization.

Thus, after determining that the receive buffer is full, in step 316 additional video stream data may be received. The additional video stream data may include data from a video stream selected for penalization, and/or from another video stream.

In step 318, video stream data may be dropped. The dropped video stream data may be video stream data from the video stream selected for penalization. For example, if the additional video stream data is for the video stream selected for penalization, the additional video stream data may be dropped (i.e., not stored in the receive buffer). Otherwise, if the additional video stream data is not for the video stream selected for penalization, video stream data for the video stream selected for penalization which is already in the receive buffer may be dropped (i.e., removed/deleted) from the receive buffer. Removing the data for the video stream selected for penalization from the receive buffer may free sufficient room in the receive buffer for the additional video stream data, and the additional video stream data may accordingly be stored in the receive buffer.

It should be noted that some embodiments may include implementing some but not all of the above-described steps. For example, in some alternate embodiments, scheduling penalties may not be imposed. In such embodiments, for example, differentiation of the video streams in order to determine a video stream to penalize may be performed in response to determining that the receive buffer is full, and the video stream selected for penalization may be penalized by having its data dropped from the receive buffer in order to make room for other video streams' data.

It should also be noted that in some embodiments, it may be necessary to penalize more than one video stream. For example, in some embodiments, the plurality of video streams may include at least three video streams, in which case at least two video streams may undergo significant drop-offs in goodput. In this case, if either of the two "bad" video streams (i.e., those having significant drop-offs in goodput) are not penalized, they may negatively affect the quality of the remaining streams. Accordingly, in such embodiments, scheduling penalties may be imposed on a subset (i.e., including the at least two "bad" video streams) of the plurality of video streams based on determining that the size of the transmit queue is above the first threshold. In addition, or alternatively, under buffer full conditions, packets of any or all of the "bad" video streams may be dropped to make room for other video stream data in such embodiments. It will of course be recognized that it may be typical for at least one video stream, and frequently for the majority of video streams, to not be selected for penalization. In other words, at least one (and typically the majority) of the video streams may not be penalized, as a goal of the disclosure may include protecting the quality of the at least one (and typically the majority) of the video streams.

Various parameters are described above with respect to different steps of the method, including the first threshold, the second threshold, the scheduling penalty (either in terms of number of scheduling opportunities or scheduling slot penalty factor (e.g., length) or both), video stream priority levels/values, and the differentiation threshold. In some embodiments, any or all of these parameters may be user configurable. For example, in some embodiments, the wireless transceiver may be configured (initially and/or with later updates) by a client device, during which user input may be received (e.g., via the second port) indicating a user preferred value for one or more of these parameters. Alternatively, or in addition, user input may be received directly to the wireless transceiver (e.g., via a user input mechanism/interface, such as a keyboard and/or mouse in combination with a display, or a touchscreen display, among other possibilities.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for protecting quality of video streams, wherein the method is implemented by a wireless transceiver, wherein the wireless transceiver comprises a transmit queue indicating video stream data to be transmitted to one or more clients, the method comprising:
    transmitting a plurality of video streams in a wireless manner;
    determining that a size of the transmit queue is above a first threshold;
    differentiating the plurality of video streams, wherein said differentiating comprises selecting a video stream to penalize in order to protect quality of other video streams of the plurality of video streams;
    imposing a scheduling penalty on the selected video stream based on determining that the size of the transmit queue is above the first threshold and based on said differentiating the plurality of video streams,
    wherein said differentiating further comprises:
        determining that the selected video stream has a lowest goodput of the plurality of video streams;
    wherein selecting the video stream to penalize is based on determining that the selected video stream has the lowest goodput of the plurality of video streams.

2. The method of claim 1, wherein said differentiating further comprises:
    determining that a difference between highest and lowest goodputs of the plurality of video streams is greater than a differentiation threshold;
    wherein if the difference between the highest and lowest goodputs of the plurality of video streams is less than the differentiation threshold, said differentiating comprises selecting the video stream to penalize based on criteria other than goodput.

3. The method of claim 1, wherein said imposing the scheduling penalty on the selected video stream comprises one or more of:
    1) skipping scheduled transmission of video stream data of the selected video stream at least one time; or
    2) reducing a length of a scheduled transmission of video stream data of the selected video stream at least one time.

4. The method of claim 1, further comprising:
    receiving user input indicating a user preferred value for one or more of:
        the first threshold; or
        the scheduling penalty.

5. The method of claim 1, further comprising:
    determining that the size of the transmit queue is below a second threshold;
    removing the scheduling penalty on the selected video stream based on determining that the size of the transmit queue is below the second threshold.

6. The method of claim 1, wherein said differentiating the plurality of video streams comprises selecting an additional video stream to penalize, the method further comprising:
    imposing a scheduling penalty on the additional selected video stream.

7. The method of claim 1, wherein the wireless transceiver comprises a receive buffer configured to store video stream data before transmitting the video stream data to the one or more clients, the method further comprising:
    determining that the receive buffer is full;
    receiving additional video stream data, wherein the received additional video stream data is not for the selected video stream;
    removing video stream data for the selected video stream from the receive buffer, wherein removing the video stream data from the receive buffer frees sufficient space in the receive buffer for the received additional video stream data, wherein said removing is based on determining that the receive buffer is full, differentiating the plurality of video streams, and receiving the additional video stream data.

8. The method of claim 1, wherein the wireless transceiver comprises a receive buffer configured to store video stream data before transmitting the video stream data to the one or more clients, the method further comprising:
    determining that the receive buffer is full;
    receiving video stream data for the selected video stream;
    dropping the received video stream data, wherein dropping the received video stream data is based on determining that the receive buffer is full and differentiating the plurality of video streams.

9. The method of claim 1,
wherein each of the plurality of video streams has a user-assigned priority level, wherein selecting a video stream to penalize comprises selecting a video stream with a lowest priority level.

10. A wireless transceiver configured to protect quality of video streams, the wireless transceiver comprising:
a first port for receiving video stream data;
a second port for transmitting video stream data to one or more clients, wherein the second port is a wireless port comprising an antenna;
control logic coupled to the first port and the second port, wherein the control logic comprises a transmit queue indicating video stream data that is to be transmitted to the one or more clients, wherein the control logic is configured to:
wirelessly transmit a plurality of video streams via the second port;
determine that a size of the transmit queue is above a first threshold;
select a video stream to penalize in order to protect quality of other video streams of the plurality of video streams;
impose a scheduling penalty on the selected video stream based on determining that the size of the transmit queue is above the first threshold and based on different characteristics the plurality of video streams,
wherein the control logic is further configured to:
determine that the selected video stream has a lowest goodput of the plurality of video streams;
wherein the control logic is configured to select the video stream to penalize based on determining that the selected video stream has the lowest goodput of the plurality of video streams.

11. The wireless transceiver of claim 10, wherein the control logic is further configured to:
determine that a difference between highest and lowest goodputs of the plurality of video streams is greater than a differentiation threshold;
wherein if the difference between the highest and lowest goodputs of the plurality of video streams is less than the differentiation threshold, the control logic is configured to select the video stream to penalize based on criteria other than goodput.

12. The wireless transceiver of claim 10, wherein, in order to impose the scheduling penalty on the selected video stream, the control logic is further configured to:
1) skip scheduled transmission of video stream data of the selected video stream at least one time; or
2) reduce a length of a scheduled transmission of video stream data of the selected video stream at least one time; or
3) perform both of steps 1 and 2.

13. The wireless transceiver of claim 10, wherein the control logic is further configured to receive user input indicating a user preferred value for one or more of:
the first threshold; or
the scheduling penalty.

14. The wireless transceiver of claim 10, wherein the control logic is further configured to:
select an additional video stream to penalize;
impose a scheduling penalty on the additional selected video stream.

15. The wireless transceiver of claim 10, wherein the wireless transceiver comprises a receive buffer configured to store video stream data before transmitting the video stream data to the one or more clients, wherein the control logic is further configured to:
determine that the receive buffer is full;
receive additional video stream data, wherein the received additional video stream data is not for the selected video stream;
remove video stream data for the selected video stream from the receive buffer, wherein removing the video stream data from the receive buffer frees sufficient space in the receive buffer for the received additional video stream data, wherein the control logic is configured to remove the video stream data based on determining that the receive buffer is full, selecting a video stream to penalize, and receiving the additional video stream data.

16. The wireless transceiver of claim 10, wherein the wireless transceiver comprises a receive buffer configured to store video stream data before transmitting the video stream data to the one or more clients, wherein the control logic is further configured to:
determine that the receive buffer is full;
receive video stream data for the selected video stream;
drop the received video stream data, wherein the control logic is configured to drop the received video stream data based on determining that the receive buffer is full and selecting a video stream to penalize.

17. A non-transitory memory medium comprising program instructions for protecting quality of video streams, wherein the video streams comprise a plurality of video streams for transmission according to a transmit queue indicating video stream data to be transmitted, wherein the program instructions are executable by a processor to:
determine that a size of the transmit queue is above a first threshold;
select a video stream to penalize in order to protect quality of other video streams of the plurality of video streams, wherein the selected video stream is selected for penalization based on one or more characteristics of the selected video stream relative to the other video streams of the plurality of video streams;
impose a scheduling penalty on the selected video stream based on determining that the size of the transmit queue is above the first threshold,
wherein the program instructions are further executable to:
determine that the selected video stream has a lowest goodput of the plurality of video streams;
wherein selecting the video stream to penalize is based on determining that the selected video stream has the lowest goodput of the plurality of video streams.

18. The non-transitory memory medium of claim 17, wherein, in order to impose the scheduling penalty on the second video stream, the program instructions are further executable to:
1) skip scheduled transmission of video stream data of the selected video stream at least one time; or
2) reduce a length of a scheduled transmission of video stream data of the selected video stream at least one time; or
3) perform both of steps 1 and 2.

19. A method for protecting quality of video streams, wherein the method is implemented by a wireless transceiver configured to receive video stream data and transmit the video stream data to one or more clients, the method comprising:
receiving video stream data for a plurality of video streams;
storing the video stream data in a receive buffer;
determining that the receive buffer is full;
differentiating the plurality of video streams, wherein said differentiating comprises selecting a video stream to penalize in order to protect quality of other video streams of the plurality of video streams;

receiving additional video stream data, wherein the additional video stream data includes video stream data for the selected stream and video stream data for other video streams of the plurality of video streams;

dropping the additional video stream data for the selected stream; dropping video stream data for the selected stream from the receive buffer, wherein dropping the video stream data for the selected stream from the receive buffer frees sufficient space in the receive buffer for the additional video stream data for other video streams of the plurality of video streams;

storing the additional video stream data for other video streams of the plurality of video streams in the receive buffer, wherein said differentiating further comprises:

determining that the selected video stream has a lowest goodput of the plurality of video streams;

wherein selecting the video stream to penalize is based on determining that the selected video stream has the lowest goodput of the plurality of video streams.

* * * * *